(12) United States Patent
Naoi et al.

(10) Patent No.: US 6,319,181 B1
(45) Date of Patent: Nov. 20, 2001

(54) SEMICONDUCTIVE RUBBER ROLLER

(75) Inventors: Masatoshi Naoi; Takashi Nozawa; Masahiro Ikeda; Tsuneo Ohki, all of Saitama-ken (JP)

(73) Assignee: Shin-Etsu Polymer Co., Ltd., Tokyo (JP)

( * ) Notice: Subject to any disclaimer, the term of this patent is extended or adjusted under 35 U.S.C. 154(b) by 0 days.

(21) Appl. No.: 09/633,100

(22) Filed: Aug. 4, 2000

(30) Foreign Application Priority Data

Aug. 5, 1999 (JP) .................................................. 11-222262

(51) Int. Cl.[7] ...................................................... B23P 15/00
(52) U.S. Cl. .................................. 492/56; 492/59; 492/53
(58) Field of Search .................................. 492/56, 59, 53; 428/391, 375, 379, 35.8, 36.92, 447; 399/333, 330

(56) References Cited

U.S. PATENT DOCUMENTS

| | | | |
|---|---|---|---|
| 4,078,286 | * 3/1978 | Takiguichi et al. | ..................... 492/56 |
| 5,482,775 | * 1/1996 | Miyabayashi | ........................ 428/375 |
| 5,582,885 | * 12/1996 | Nakamura et al. | .................. 428/35.8 |
| 5,827,160 | * 10/1998 | Ohki et al. | ............................... 492/56 |
| 5,895,711 | * 4/1999 | Yamaki et al. | ...................... 428/36.9 |
| 6,261,214 | * 7/2001 | Meguriya | ................................ 492/56 |

* cited by examiner

*Primary Examiner*—I Cuda-Rosenbaum
(74) *Attorney, Agent, or Firm*—Wenderoth, Lind & Ponack, L.L.P.

(57) ABSTRACT

A semiconductive rubber roller used in a printer of a photocopying machine, which is an elongated integral body consisting of a shaft of a metal, a semiconductive foamed rubber layer on and around the shaft and a semiconductive solid, i.e. non-foamed, silicone rubber layer on and around the foamed rubber layer. Unexpected improvements can be obtained in the performance and durability of the roller when the silicone rubber forming the solid silicone rubber layer contains low molecular weight organopolysiloxane molecules having a degree of polymerization not exceeding 20 in an amount not exceeding 1.0% by weight and by providing the surface of the semiconductive solid silicone rubber layer with a covering layer which may be a coating layer of a resinous coating composition or a skin layer having a modified nature by a chemical or physical treatment such as ultraviolet irradiation.

6 Claims, 2 Drawing Sheets

SEMICONDUCTIVE RUBBER ROLLER

BACKGROUND OF THE INVENTION

The present invention relates to a semiconductive rubber roller used as a development roller, electrostatic charging roller and image-transfer roller in photocopying machines, printers, facsimile machines and the like.

Semiconductive rubber rollers having a semiconductive foamed rubber layer provided coaxially on and around a shaft of an electro-conductive material such as metals are known and widely employed, for example, as a development roller in photocopying and printing machines. FIG. 2 of the accompanying drawing is a schematic cross sectional illustration of such a development system in a photocopying machine in which the development roller 13 which is a semiconductive rubber roller bearing triboelectrically chargeable toner particles in a thin layer on the outer surface is provided to effect development and visualization of the latent image formed therein. The development system of FIG. 2 comprises, besides the development roller 13, a photosensitive drum 11, LEED array 12, toner-carrier roller 14, transfer roller 15, cleaning roller 16, charging roller 17 and development blade 18 as a toner layer limiter on the recording paper sheet 19.

The semiconductive rubber rollers used in the above mentioned applications are required to satisfy various requirements, for example, for adequate electric conductivity, weatherability to withstand adverse ambient conditions, relatively low hardness of the rubber layer, good triboelectric charging behavior and so on. These requirements are satisfied in conventional semiconductive rubber rollers by using a semiconductive rubber composition prepared from a non-conductive rubber compound such as urethane rubbers, NBRs, silicone rubbers and the like with a conductivity-imparting particulate material including electron-conductive agents such as carbon blacks, graphite powders and the like and ion-conductive fillers.

A serious problem encountered in the use of a conventional semiconductive rubber roller prepared by using a urethane rubber, NBR and the like as the base rubber compound of the semiconductive rubber is that, since the rubber composition is formulated with admixture of certain liquid additives such as process oils and softening agents, the rubber hardness of the rubber layer of the roller cannot be high and bleeding of the liquid additives is sometimes unavoidable. A conventional countermeasure taken for preventing bleeding of the liquid additives is to provide a protecting coating layer of a synthetic resin such as a urethane resin on the surface of the semiconductive rubber layer of the roller. While being effective for preventing bleeding, however, this method is not quite effective for improving the weather-ability or durability of the semiconductive rubber roller in an adverse ambient condition. When the semiconductive rubber roller is prolongedly exposed to an atmosphere of a high temperature and high humidity, for example, a reaction of hydrolysis proceeds in the resinous ingredient constituting the protective coating layer resulting in eventual sticking of the semiconductive rubber roller onto the latent image-carrying surface or in uncontrollable great fluctuation of the electric properties of the roller surface depending on the variations in the temperature and humidity. Since the electric chargeability of toner particles depends on the ambient conditions, furthermore, charge distribution in the toner is unavoidably broadened so that variations in the temperature and humidity sometimes result in occurrence of fogging in the background areas of printed images due to deficiency in charging on the surface of the semiconductive rubber roller.

On the other hand, development rollers of which the semiconductive rubber layer is formed from a silicone rubber-based semiconductive rubber composition have a problem that, though advantageous in respect of good stability against variations of the ambient conditions and absence of ambience-dependent fluctuations of the electric resistivity, the surface of the latent-image carrier and the toner particles are sometimes stained due to bleeding of the liquid ingredients contained therein adversely affecting development performance.

As a countermeasure for these problems in the prior art, the inventors previously proposed a method for preventing stain on the surface of the latent-image carrier and toner particles by decreasing the content of low molecular-weight fractions in the organopolysiloxane constituting the silicone rubber forming the semiconductive foamed rubber layer of the roller. This method was successful to some extent in providing semiconductive silicone rubber rollers of low stain.

The above mentioned proposal for decreasing the content of low molecular-weight fractions in the organopolysiloxane constituting the semiconductive silicone rubber is performed by conducting the polymerization procedure to prepare the organopolysiloxane gum from an oligomeric organopolysiloxane under such conditions as to decrease the residual amount of the unreacted low molecular-weight organopolysiloxane as far as possible or by removing the low molecular-weight fractions in the organopolysiloxane as polymerized by extraction with an organic solvent.

The former method mentioned above, however, has a problem that, when such a measure is undertaken, the number of the cross-linking points available for curing of the silicone rubber cannot be large enough so that the mechanical strength of the cured silicone rubber is correspondingly low resulting in a decrease in the durability of the thus prepared semiconductive silicone rubber roller.

The latter method mentioned above also has a problem that, as a consequence of the extraction with an organic solvent, the silicone rubber is unavoidably subject to degradation of various properties also resulting in a decrease in the durability of the semiconductive silicone rubber roller.

SUMMARY OF THE INVENTION

The present invention accordingly has an object to provide a novel and improved silicone rubber-based semiconductive rubber roller used in photocopying machines and printers of which the problems relative to stain of the surface of the latent-image carrier and toner particles can largely be solved.

The silicone rubber-based semiconductive rubber roller provided by the present invention is an integral elongated body which comprises:

(a) a shaft made from an electroconductive material such as metals;

(b) a semiconductive foamed rubber layer formed coaxially on and around the shaft;

(c) a solid, i.e. non-foamed or non-porous, semiconductive silicone rubber layer formed coaxially on and around the semiconductive foamed rubber layer from a silicone rubber of which the content of low molecular weight species of organopolysiloxane having a degree of polymerization not exceeding 20 does not exceed 1.0% by weight; and (d) a covering layer formed on the surface of the semiconductive solid silicone rubber layer.

DETAILED DESCRIPTION OF THE PREFERRED EMBODIMENTS

The invention to provide the above defined semiconductive rubber roller has been completed as a result of the inventors' extensive investigations to accomplish the above mentioned object, in which the inventors have directed their attention to the fact that the troubles due to stain of the surface of the latent-image carrier and the toner particles are deeply correlated with the content of low molecular weight species of the organopolysiloxane, referred to as the low molecular siloxane hereinafter, in the silicone rubber as a base material forming the semiconductive rubber roller. In conducting the investigations directed mainly to the silicone rubber composition for forming the semiconductive solid silicone rubber layer, i.e. the layer (c), the inventors have come to unexpected discoveries of the facts that:

(1) the low molecular siloxane contained in the silicone rubber composition is the most important factor to cause stain on the surface of the latent-image carrier and the toner particles;

(2) a printed matter free from the defects such as skipped printing, uneven printing and fogging can be obtained with stability by preventing deposition or transfer of the low molecular siloxane to the surface of the latent-image carrier and toner particles when the content of the low molecular siloxane in the silicone rubber composition does not exceed 1.0% by weight;

(3) even with a somewhat larger degree of polymerization than 20, the content of organopolysiloxane species having a relatively low molecular weight should desirably be as low as possible;

(4) when a solid silicone rubber layer is provided coaxially on and around the semiconductive foamed rubber layer, the development characteristics of the semiconductive rubber roller can be so high as not to be attained with a semiconductive foamed rubber roller in respect of accuracy and quality of the printed matter; and (5) while a semiconductive solid silicone rubber layer, when exposed bare, is subject to wearing in a long-run service by rubbing with the photosensitive drum and toner-transfer roller resulting in a decrease in the quality of printing in the lapse of time, this problem can be solved by providing a covering layer on the surface of the semiconductive solid silicone rubber layer to ensure use of the roller over a long period of time without decreasing the printing quality, leading to completion of the present invention on the base of these discoveries.

Figure 1A:
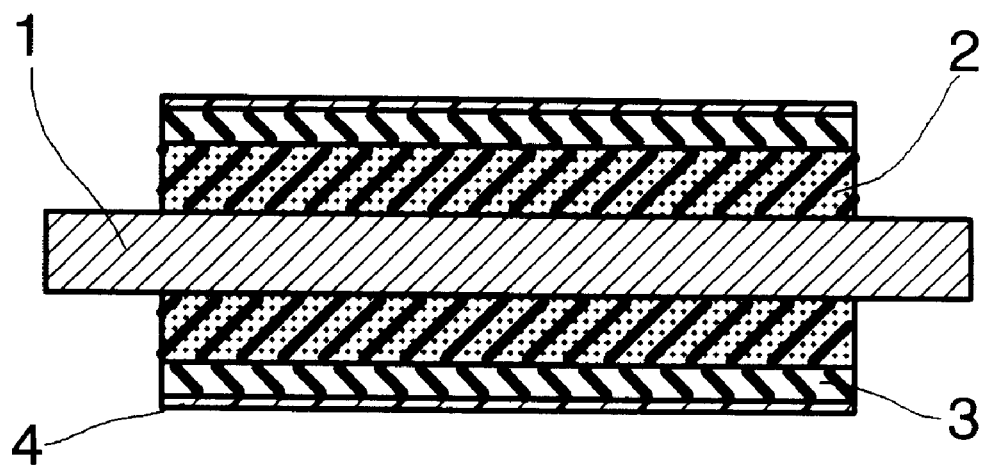
FIGS. 1A and 1B are an axial cross sectional view and a radial cross sectional view, respectively, of the semiconductive rubber roller of the invention.
Figure 1B:
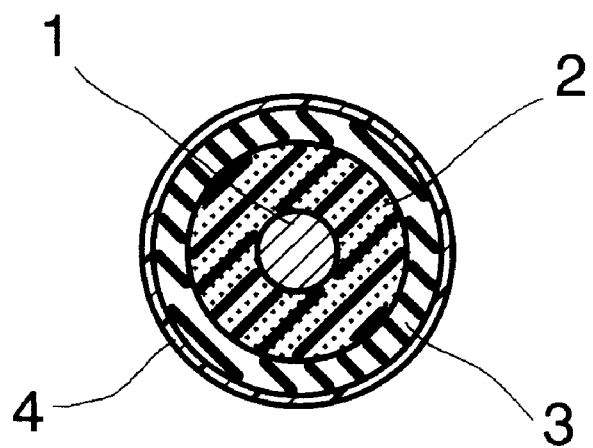
Figure 2:
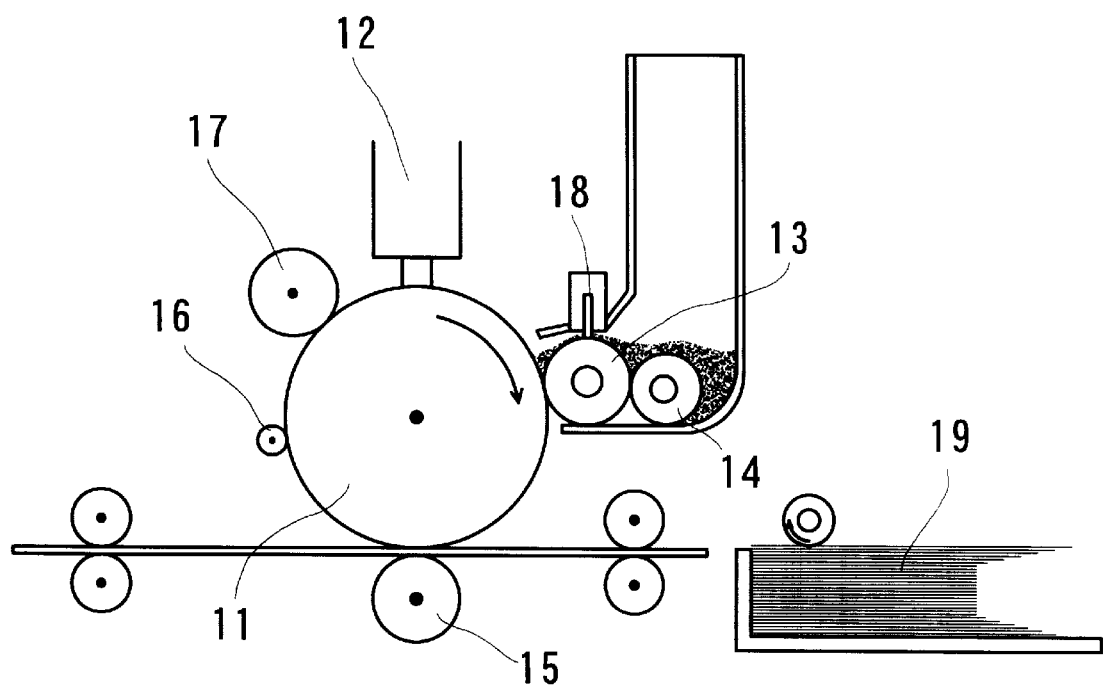
FIG. 2 is a schematic illustration of the printer system in a photocopying machine utilizing the semiconductive rubber roller of the invention.

In the following, a detailed description is given of the silicone rubber-based semiconductive rubber roller of the present invention by making reference to FIGS. 1A and 1B which schematically illustrate a typical example of the inventive roller by an axial cross sectional view and a radial cross sectional view, respectively.

As is illustrated in these figures, the silicone rubber-based semiconductive rubber roller of the invention comprises (a) a shaft 1 made from an electrically conductive material, (b) a layer 2 made from a semiconductive foamed rubber, (c) a layer 3 made from a semiconductive solid, i.e. non-foamed or non-porous, silicone rubber, and (d) a covering layer 4.

The electroconductive material forming the shaft 1 of the inventive semiconductive rubber roller can be selected from a metallic material such as iron, stainless steel, aluminum, brass and the like but the shaft 1 can be a rod of a thermoplastic or thermosetting synthetic resin having a metallic plating layer on the surface to impart electric conductivity or a rod shaped from a conductive resin composition compounded with an electroconductivity-imparting powder such as a carbon black or a metal powder.

It is usual that the electroconductive shaft 1 of the inventive semiconductive rubber roller is used by grounding or by applying a bias voltage so that the semiconductive rubber roller is enabled to exhibit stable performance for electrostatic charging of the latent-image carrier, injection of electrostatic charges to the toner particles and development of the electrostatic latent images by transfer of the toner from the latent-image carrier.

The semiconductive foamed rubber layer 2 is formed by curing a semiconductive rubber composition compounded with a conductivity-imparting agent and a blowing agent under simultaneous expansion by foaming into a foamed rubber body.

The rubbery polymer as the base of the above mentioned foamable semiconductive rubber composition is not particularly limitative provided that the foamed rubber layer 2 after curing is stable without spontaneous drooping deformation or plastic deformation. Examples of suitable rubbery polymers include, besides natural rubber, various kinds of synthetic rubbers such as butadiene-styrene copolymeric rubbers, acrylonitrile-butadiene copolymeric rubbers, acrylonitrile-butadiene-styrene ternary copolymeric rubbers, styrene-ethylene-styrene block copolymeric rubbers, ethylene-propylene copolymeric rubbers, ethylene-propylene-diene (EPDM) copolymeric rubbers and other copolymeric rubbers, polychloroprene rubbers, silicone rubbers, polybutadiene rubbers, polyisoprene rubbers, chloro-sulfonated polyethylene rubbers, silicone-modified EPDM rubbers, polysulfide rubbers, fluorocarbon rubbers, urethane rubbers and so on as well as thermoplastic elastomers such as polyester elastomers and the like. In addition, several types of thermoplastic resins having elasticity at room temperature such as polyvinyl chloride resins, polyvinyl acetate resins and vinyl chloride-vinyl acetate copolymeric resins can also be used for the purpose. Silicone rubbers are particularly preferred among them in respects of their high resistance against aging, excellent electric insulation characteristics, high heat resistance, low permanent compression set and good workability if not to mention the advantages in stability of the costs.

The rubber composition for the formation of the semiconductive foamed rubber layer 2 on and around the shaft 1 can be prepared by compounding 100 parts by weight of the above exemplified rubbery or elastomeric polymer with from 0.5 to 60 parts by weight of one or a combination of conductivity-imparting agents including carbon blacks, graphite powders, powders of a metal such as nickel, aluminum and copper and powders of a conductive metal oxide such as zinc oxide and tin oxide as well as powders of an insulating material such as barium sulfate, titanium dioxide and potassium titanate provided on the particle surface with a conductive coating layer of tin oxide and the like. The rubber composition is further compounded with a curing agent of the kind depending on the types of the rubbery polymer to be crosslinked including, when the rubber is a silicone rubber, organic peroxides and a combination of an organohydrogenpolysiloxane and a catalytic amount of a platinum compound assuming that the organo-polysiloxane molecules of the silicone rubber have silicon-bonded vinyl groups. The rubber composition must be further compounded with an organic blowing agent such as azobisisobutyronitrile (AIBN), azodicarbonamide (ADCA) in an amount in the range from 0.1 to 10 parts by weight per 100 parts by weight of the rubbery polymer depending on the desired degree of foaming. It is of course advantageous that a silicone rubber-based composition is compounded with a substantial amount of a reinforcing filler such as fumed silica fillers and precipitated silica fillers.

A variety of organopolysiloxane gums including dimethylpolysiloxane gums, methyl vinyl polysiloxane gums and methyl phenyl polysiloxane gums as well as silicone-modified EPDM rubbers can be used as the base ingredient in the silicone rubber composition for the formation of the semiconductive solid rubber layer 3 on and around the semiconductive foamed rubber layer 2. It is essential that the content of the low molecular siloxane in the silicone rubber forming the layer 3 does not exceed 1.0% by weight.

The other essential ingredients to be compounded in the silicone rubber composition for the semiconductive solid silicone rubber layer 3 include a conductivity-imparting agent and a curing agent for the silicone rubber which can be selected from those given as the examples for the semiconductive foamed rubber layer 2. The amounts of these ingredients and the optional reinforcing fillers can also be the same as in the layer 2.

The silicone rubber composition for the formation of the semiconductive solid silicone rubber layer 3 can be shaped and cured in the form of the layer 3 having a thickness of 1 to 5 mm by an appropriate method. For example, the silicone rubber composition as plasticized is extrusion-molded into a tubular form followed by a heat treatment for curing or the silicone rubber composition is compression-molded under heating to effect simultaneous curing in a metal mold having a cylindrical cavity to give a cured solid silicone rubber tube 3 into which the semiconductive foamed rubber layer 2 supported on the shaft 1 is inserted to provide the solid silicone rubber layer 3 on and around the foamed rubber layer 2. Further alternatively, the semiconductive solid silicone rubber layer 3 is formed on and around the semiconductive foamed rubber layer 2 by extrusion molding of the silicone rubber composition therefor in a metal mold holding the foamed rubber layer 2 on the shaft 1 formed in advance. It is of course a possible way that the rubber composition for the foamed rubber layer 2 and the silicone rubber composition for the solid silicone rubber layer 3 are subjected to two-color extrusion molding coaxially on and around the shaft 1 followed by a heat treatment to effect curing of the layers 2, 3 and foaming of the layer 2. Injection molding machines and compression molding presses can also be employed in this process.

As is mentioned above, it is essential that the content of the low molecular siloxane in the silicone rubber forming the semiconductive solid silicone rubber layer 3 does not exceed 1.0% by weight. When the content of the low molecular siloxane therein exceeds this upper limit, the semiconductive solid silicone rubber layer 3 after curing can be subjected to an extraction treatment with an organic solvent such as toluene and methylene chloride to remove at least a part of the low molecular siloxane to a decreased content not exceeding the above mentioned upper limit. The method for removing the low molecular siloxane from a cured silicone rubber is, however, not limited to the above mentioned extraction with an organic solvent. For example, the semiconductive silicone rubber layer 3 after curing by heating is subjected to a further heat treatment at a temperature of about 200° C. for 15 to 20 hours in a Geer oven equipped with a ventilation system to effect vaporization of the low molecular siloxane until the content thereof is decreased to a level not exceeding the above defined upper limit.

In the following, a method for the preparation of the inventive semiconductive rubber roller is described by way of a non-limitative example of the procedure in which a tubular body 3 of a semiconductive silicone rubber is prepared and a semiconductive foamed rubber layer 2 supported on a shaft 1 prepared separately is inserted into the tubular body 3 as a covering layer on and around the foamed rubber layer 2.

In the first place, a layer of a foamable rubber composition for the semiconductive foamed rubber layer 2 is formed on and around the outer surface of the electroconductive shaft 1 by extrusion in an extruder machine using a crosshead followed by a heat treatment in a Geer oven or an infrared oven to effect foaming and primary curing of the foamable rubber composition to form a semiconductive foamed rubber layer 2 coaxially on and around the electroconductive shaft 1. Alternatively, the foamed rubber layer 2 on and around the shaft 1 can be formed by a method of injection molding of the foamable rubber composition into a metal mold holding the electroconductive shaft 1 to effect foaming and primary curing of the foamable rubber composition by heating or at room temperature or a method of compression molding under heating in a metal mold holding the electroconductive shaft 1. Thereafter, the semiconductive foamed rubber layer 2 is subjected to a heat treatment in a Geer oven for a specified length of time to effect secondary curing of the rubber composition for stabilization of the physical properties of the semiconductive foamed rubber layer 2 integrated with the shaft 1.

After machining, if necessary, on a cylindrical grinder and the like to obtain a desired outer diameter of the semiconductive foamed rubber layer 2, the integral body of the shaft 1 and the foamed rubber layer 2 is inserted into a tubular body of the non-foamed silicone rubber to provide the semiconductive solid silicone rubber layer 3 on and around the semiconductive foamed rubber layer 2. It is optional according to need to use an electroconductive adhesive so as to increase the adhesive bonding strength between the foamed rubber layer 2 and the solid silicone rubber layer 3.

If necessary, the outer surface of the semiconductive solid silicone rubber layer 3 can be machined by using a cylindrical grinder, shot blaster, sand blaster, lapping machine, buffing machine and the like to obtain a specified outer diameter of the layer 3.

The semiconductive rubber roller of the present invention is finished by forming a covering layer 4 on the outer surface of the semiconductive solid silicone rubber layer 3 formed in the above described manner. The covering layer 4 here implied, which may be called a skin layer, means a great variety of surface layers including not only a coating layer having a visible or measurable thickness but also any surface layers having a modified property imparted by a chemical or physical treatment provided that the layer 4 can exhibit a protective effect on the underlying semiconductive solid silicone rubber layer 3. Besides coating layers of a resinous coating composition having a visible thickness, for example, the covering layer 4 includes a surface layer modified to bear various functional groups bonded to the surface in a chemical reaction by a surface treatment of the semiconductive solid silicone rubber layer 3 with a silane coupling agent.

When the covering layer 4 is formed by coating the surface with a resinous coating composition, the resin as the principal ingredient of the coating composition is selected from those capable of exhibiting good adhesion to the surface of the semiconductive solid silicone rubber layer 3 and high resistance against wearing by rubbing with the photosensitive drum or toner particles. Particular examples of synthetic resins suitable therefor include silicone resins, fluorocarbon resins, urea resins, alkyd resins and acrylic resins as well as those obtained by chemically modifying these synthetic resins either singly or as a combination of two kinds or more, if compatible.

It is important that the semiconductivity of the inventive semiconductive rubber roller comprising the semiconductive foamed rubber layer 2 and semiconductive solid silicone rubber layer 3 on the conductive shaft 1 is not greatly affected by the covering layer 4 adequately selecting the thickness of the covering layer 4. If necessary, the coating composition for the formation of the covering layer 4 can be admixed with a conductivity-imparting agent to increase the conductivity of the covering layer 4.

The above mentioned conductivity-imparting agent admixed in the resinous coating composition for the covering layer 4 can be selected from carbonaceous powders such as carbon blacks and graphite powders, powders of a metal such as nickel, aluminum, copper and silver and powders of a conductive metal oxide such as zinc oxide and tin oxide. The amount of these conductivity-imparting agents admixed in the coating composition naturally depends on the desired semiconductivity level of the inventive semiconductive rubber roller as finished. If desired, it is optional that the coating composition for the covering layer 4 is admixed with a filler such as powders of a silicone resin, fluorocarbon resin and the like with an object to improve the wearing resistance of the covering layer 4.

The adaptability of a method for the formation of the covering layer 4 with the above described resinous coating composition naturally depends on the nature of the respective resins including roller coating, spray coating, gravure coating and the like with a solution of the resin in an organic solvent or an aqueous emulsion of the resin and dip coating in a solution or emulsion of the resin. A method of melt coating can also be applied if the resin is a thermoplastic resin having an adequate melting point.

As is mentioned above, the covering layer 4 can be formed also in a physical treatment of the surface of the semiconductive solid silicone rubber layer 3 by irradiating the surface with actinic rays such as ultraviolet light and electron beams. Though optional when the covering layer 4 is formed by coating with a resinous coating composition, it is sometimes advantageous that the surface of the resinous covering layer 4 is further subjected to the above mentioned physical surface treatment to effect modification of the surface nature of the resinous covering layer 4.

Chemical methods are also applicable to the formation of the covering layer 4 on the surface of the semiconductive solid silicone rubber layer 3, for example, by applying a coupling agent to the surface. The coupling agent used here should preferably have alkoxy groups as the functional groups to provide the bonding sites to the surface of the silicone rubber layer 3. The electron-donating or electron-accepting functional groups of the coupling agent in a free state serve to adjust the electrostatic charges imparted to the toner particles. When the toner particles are negatively chargeable, in particular, it is preferable to use a coupling agent having an electron-donating functional group such as amino, hydroxyl and ether groups or, when the toner particles are positively chargeable, it is preferable to use a coupling agent having an electron-accepting functional group such as nitroso, carbonyl and carboxyl groups so that the charging behavior to the toner particles can further be improved resulting in a decrease in fogging on the printed matter, prevention of adherence of the toner and improvement of the wearing resistance.

Particular examples of the above mentioned coupling agent usable here include silane coupling agents such as vinyl triethoxy silane and 3-aminopropyl triethoxy silane, titanate coupling agents such as isopropyl titanate and triethanolamine titanate and aluminate coupling agents. These coupling agents can be applied to the surface in the form of a solution in an organic solvent. It is optional that two kinds or more of different coupling agents are used in combination in an organic solution for coating or a primer solution is prepared by adding an organopolysiloxane to a solution of the silane coupling agent for coating.

It is also desirable that the covering layer 4 formed by coating with a coupling agent is further subjected to a physical surface treatment by irradiation with ultraviolet light or electron beams. Irradiation of the silicone rubber surface with ultraviolet light has an effect to promote crosslinking of the silicone rubber at or in the vicinity of the surface of the semiconductive solid silicone rubber layer 3 resulting in an improvement of the mechanical strength of the silicone rubber layer 3 along with formation of microscopic ruggedness of the surface contributing to improvement of the printing quality. The ultraviolet light for the above mentioned irradiation treatment should have a wavelength in the range from 100 to 380 nm so that low-pressure mercury lamps commercially available on the market can be used as the ultraviolet light source. The total dose of the ultraviolet light in the irradiation treatment is in the range from 1.2 to 76 $J/cm^2$ to obtain a full effect of improvement.

While irradiation of the surface of the covering layer 4 with ultraviolet light or electron beams has an effect of producing microscopically fine ruggedness of the surface, as is mentioned above, such microscopically fine ruggedness of the surface can be obtained by a mechanical means to exhibit advantages close to those obtained by ultraviolet irradiation. The mechanical means for producing the surface ruggedness includes use of a metal mold of which the cavity surface has corresponding ruggedness in compression molding or injection molding of the rubber layer of the inventive semiconductive rubber roller and use of a suitable machine such as a grinder by which the surface of the silicone covering layer 4 is machined. The surface ruggedness to be produced can be defined in terms of the surface roughness value Rz which should be in the range from 0.3 to 80 $\mu m$ in order to obtain a substantial improvement in the printing quality.

In the following, the semiconductive rubber roller of the invention is described in more detail by way of Examples which, however, never limit the scope of the invention in any way.

The semiconductive rubber rollers prepared in the following Examples and Comparative Examples were subjected to the evaluation tests for the items given below by the testing procedures respectively given there.

(1) Roller Resistance

The semiconductive rubber roller under testing was mounted on a horizontal elongated gold-plated electrode plate having a length larger by 5 mm than the rubber layers 2,3 of the roller and pressed against the electrode plate by hanging a 500 g weight on each of the end portions of the metal shaft 1. Measurement of the electric resistance was made between the metal shaft 1 and the electrode plate by applying a DC voltage of 10 volts therebetween. The roller resistance of a semiconductive rubber roller is desirably in the range from $1\times10^3$ to $1\times10^{10}$ ohm depending on the intended application of the roller.

(2) Fogging on Printed Matter

Test printing of a 5% duty pattern was conducted in an atmosphere of 60% relative humidity at 25° C. by using a photocopying printer equipped with the semiconductive rubber roller under testing and the Macbeth density of the background areas was measured by using a Macbeth densitometer. The results were recorded for the printed sheets obtained at the start of the test printing and after 6000 times of printing runs for durability test. Evaluation of the results was made in two ratings of "acceptable" and "unacceptable" when each of the fogging density values at the start and after 6000 times running did not exceed or did exceed 0.15, respectively.

(3) Printing Density

Full-black test printing was undertaken in the same manner as above up to 6000 times and the Macbeth density of the printed areas was measured with a Macbeth densitometer. Evaluation of the results was made in two ratings of "acceptable" and "unacceptable" when each of the density values at the start and after 6000 times running was 1.3 or higher or lower than 1.3, respectively.

(4) Void

Test printing of 6000 times was conducted for a gray tone and the printed sheet obtained by the 6000th printing run was visually inspected to detect a local spot where the printing density was lower than around.

(5) Unevenness

Test printing of 6000 times was conducted for a gray tone and the printed sheet obtained by the 6000th printing run was visually inspected to detect a local area where the printing density was higher than around.

(6) Toner Adhesion

The surface of the roller under testing after 6000 times running of test printing was microscopically examined to detect adhesion of toner particles to the surface.

EXAMPLE 1

A SUS 22 grade stainless steel rod plated with nickel by an electroless plating method and having a diameter of 10 mm and a length of 250 mm was employed as the electroconductive shaft. The shaft was coated with a silicone primer (Primer No. 16, a product by Shin-Etsu Chemical Co.) and subjected to a baking treatment at 150° C. for 10 minutes in a Geer oven.

Separately, a foamable silicone rubber composition for the semiconductive foamed rubber layer was prepared by uniformly blending, in a pressurizable kneader, 100 parts by weight of an organopolysiloxane gum for silicone rubber (KE 78VES, a product by Shin-Etsu Chemical Co.), 10 parts by weight of a carbon black (Thermal Black, a product by Asahi Carbon Co.) and 25 parts by weight of a fumed silica filler (Aerosil 200, a product by Nippon Aerosil Co.) followed by further admixture of 2.0 parts by weight of an organic peroxide-based curing agent for silicone rubber (C-8, a product by Shin-Etsu Chemical Co.) and 2.0 parts by weight of a blowing agent.

A semiconductive foamed silicone rubber layer 2 was formed on and around the shaft by the curing-adhesion molding method at 175° C. for 10 minutes by using a metal mold for compression molding having a cylindrical cavity of 20 mm inner diameter followed by a secondary curing treatment in a Geer oven at 200° C. for 7 hours. The thus obtained foamed silicone rubber layer was machined on a cylindrical grinder to give an integral roller-formed body consisting of the shaft 1 and the coaxial semiconductive foamed silicone rubber layer 2 having an outer diameter of 18 mm and a length of 210 mm.

Further separately, a non-foamable silicone rubber composition for the semiconductive solid silicone rubber layer was prepared by uniformly blending, in a pressurizable kneader, 100 parts by weight of an organopolysiloxane gum for silicone rubber (KE 78VES, supra), of which the content of the low molecular siloxane having a degree of polymerization not exceeding 20 did not exceed 0.85% by weight, 10 parts by weight of a carbon black (Thermal Black, supra) and 25 parts by weight of a fumed silica filler (Aerosil 200, supra) followed by further admixture of 2.0 parts by weight of a curing agent for silicone rubber (C-19A, a product by Shin-Etsu Chemical Co.). This silicone rubber composition was extrusion-molded by using an extruder machine into a tubular form having an outer diameter of 22 mm and an inner diameter of 18 mm which was cured by heating in an infrared oven. The thus cured silicone rubber tube was immersed and kept in methylene chloride for 3 days at room temperature followed by drying at 120° C. for 2 hours to finish a silicone rubber tube for the semiconductive solid silicone rubber layer.

The roller-formed integral body of the shaft and the foamed silicone rubber layer was coated with a silicone-based electroconductive adhesive (KE 4578, a product by Shin-Etsu Chemical Co.) and inserted into the above prepared silicone rubber tube followed by standing for 3 days at room temperature and then grinding of the surface on a cylindrical grinder to give a roller-formed integral body consisting of the shaft, the foamed silicone rubber layer and the solid silicone rubber layer of which the outer diameter was 20 mm and the length of the rubber layers was 210 mm.

The thus obtained roller-formed body was coated, after application of a primer (Primer C, a product by Shin-Etsu Chemical Co.), with a urethane-based coating composition (Daipla Coat, a product by Dainichi Seika Kogyo Co.) in a coating thickness of 20 μm followed by a heat treatment at 200° C. for 30 minutes in a Geer oven to effect drying and curing of the coating layer into a polyurethane-based covering layer of the roller. Finally, the surface of the thus formed polyurethane-based covering layer was subjected to an ultraviolet irradiation treatment by using a low-pressure mercury lamp to finish the semiconductive rubber roller of the invention.

The surface roughness Rz of the roller was 35 μm. The content of the low molecular siloxane in the semiconductive solid silicone rubber layer was 0.62% by weight as determined by the gel permeation chromatographic method.

The results of the evaluation tests of this semiconductive rubber roller are shown in Table 1 below indicating that this roller is generally acceptable as a commercial product.

EXAMPLE 2

The procedure for the preparation of the semiconductive rubber roller was substantially the same as in Example 1 except that the covering layer was formed, instead of coating with the urethane-based coating composition, by applying an amino group-containing silane coupling agent (KBM 603, a product by Shin-Etsu Chemical Co.).

The surface roughness Rz of the roller was 43 μm. The content of the low molecular siloxane in the semiconductive solid silicone rubber layer was 0.82% by weight.

The results of the evaluation tests of this semiconductive rubber roller are shown in Table 1 below indicating that this roller is generally acceptable as a commercial product.

EXAMPLE 3

The procedure for the preparation of the semiconductive rubber roller was substantially the same as in Example 1 except that the semiconductive foamed rubber layer was formed, in place of the silicone rubber composition, from a urethane rubber composition as is described below.

Thus, a foamable urethane rubber composition admixed with a carbon black (Ketjen Black, a trade name) as an electroconductivity-imparting agent was extrusion-molded into the form of a sheet which was heated at 70° C. under a reduced pressure of 60 mmHg so that the sheet was expanded to give a foamed urethane rubber sheet. This foamed urethane rubber sheet was wound around the shaft and compression-molded in a metal mold after a mold-release treatment to give a roller-formed integral body consisting of the shaft and the foamed urethane rubber layer. The subsequent procedure for the preparation of the finished roller was substantially the same as in Example 1.

The surface roughness Rz of the roller was 28 μm. The content of the low molecular siloxane in the semiconductive solid silicone rubber layer was 0.17% by weight.

The results of the evaluation tests of this semiconductive rubber roller are shown in Table 1 below indicating that this roller is generally acceptable as a commercial product.

COMPARATIVE EXAMPLE 1

The procedure for the preparation of the semiconductive rubber roller was about the same as in Example 1 except that the covering layer was not formed on the surface of the semiconductive solid silicone rubber layer.

The surface roughness Rz of the roller was 81 μm. The content of the low molecular siloxane in the semiconductive solid silicone rubber layer was 1.40% by weight.

The results of the evaluation tests of this semiconductive rubber roller are shown in Table 1 below indicating that this roller is generally unacceptable as a commercial product.

COMPARATIVE EXAMPLE 2

The procedure for the preparation of a semiconductive rubber roller was about the same as in Example 1 except that the semiconductive solid silicone rubber layer was replaced with a solid rubber layer formed from the same urethane rubber composition as used in Example 3 for the semiconductive foamed rubber layer, in which the blowing agent was omitted and the step of expansion of the rubber layer was not undertaken.

The surface roughness Rz of the roller was 86 μm. The results of the evaluation tests of this semiconductive rubber roller are shown in Table 1 below indicating that this roller is generally unacceptable as a commercial product.

TABLE 1

|  |  | Example | | | Comparative Example | |
|---|---|---|---|---|---|---|
|  |  | 1 | 2 | 3 | 1 | 2 |
| Roller resistance, Mohm |  | 1.3 | 7.3 | 6.1 | 2.3 | 11 |
| Fogging | initial | 0.011 | 0.012 | 0.009 | 0.11 | 0.012 |
|  | after running | 0.012 | 0.011 | 0.01 | 1.14 | 0.015 |
| Printing density | initial | 1.42 | 1.39 | 1.43 | 1.41 | 1.38 |
|  | after running | 1.37 | 1.33 | 1.36 | 1.31 | 1.29 |
| Void |  | no | no | no | yes | yes |
| Unevenness |  | no | no | no | yes | yes |
| Toner adhesion |  | no | no | no | yes | yes |

What is claimed is:

1. A silicone rubber-based semiconductive rubber roller as an integral elongated body which comprises:
   (a) a shaft made from an electroconductive material;
   (b) a semiconductive foamed rubber layer formed coaxially on and around the shaft;
   (c) a semiconductive solid silicone rubber layer formed coaxially on and around the semiconductive foamed rubber layer from a silicone rubber of which the content of low molecular weight species of organopolysiloxane having a degree of polymerization not exceeding 20 does not exceed 1.0% by weight; and
   (d) a covering layer formed on the surface of the semiconductive solid silicone rubber layer.

2. The semiconductive rubber roller as claimed in claim 1 in which the semiconductive foamed rubber layer (b) is a layer of a semiconductive foamed silicone rubber.

3. The semiconductive rubber roller as claimed in claim 1 in which the semiconductive silicone rubber layer (c) has a thickness in the range from 1 mm to 5 mm.

4. The semiconductive rubber roller as claimed in claim 1 in which the covering layer is a coating layer of a resinous coating composition.

5. The semiconductive rubber roller as claimed in claim 1 in which the covering layer is a skin layer of the semiconductive solid silicone rubber layer of which the nature is modified by irradiation with ultraviolet light in a dose in the range from 1.2 to 76 J/cm$^2$.

6. The semiconductive rubber roller as claimed in claim 1 in which the surface roughness Rz is in the range from 0.3 to 80 μm.

* * * * *